(12) United States Patent
Kathiresan

(10) Patent No.: US 8,483,322 B2
(45) Date of Patent: Jul. 9, 2013

(54) AUTOMATIC FREQUENCY CORRECTION

(75) Inventor: Ganesh Kathiresan, Oxfordshire (GB)

(73) Assignee: Toumaz Technology Limited, Oxfordshire (GB)

( * ) Notice: Subject to any disclaimer, the term of this patent is extended or adjusted under 35 U.S.C. 154(b) by 399 days.

(21) Appl. No.: 12/682,699

(22) PCT Filed: Jul. 28, 2008

(86) PCT No.: PCT/GB2008/050630
§ 371 (c)(1),
(2), (4) Date: Apr. 12, 2010

(87) PCT Pub. No.: WO2009/050499
PCT Pub. Date: Apr. 23, 2009

(65) Prior Publication Data
US 2010/0239051 A1 Sep. 23, 2010

(30) Foreign Application Priority Data
Oct. 19, 2007 (GB) .................................. 0720410.0

(51) Int. Cl.
*H04L 27/14* (2006.01)
*H04L 27/06* (2006.01)
*H04L 27/22* (2006.01)
(52) U.S. Cl.
USPC ........... 375/334; 375/326; 375/344; 329/302; 455/208
(58) Field of Classification Search
USPC .................. 375/272, 273, 279–281, 326, 327, 375/329, 332, 334, 344; 329/300, 302, 304, 329/306–308, 318, 325; 455/205, 208, 209
See application file for complete search history.

(56) References Cited

U.S. PATENT DOCUMENTS 5,528,633 A * 6/1996 Halik et al. .................. 375/326
5,633,898 A 5/1997 Kishigami et al.
(Continued)

FOREIGN PATENT DOCUMENTS

EP 0 394 064 A2 10/1990
EP 1 631 030 A1 3/2006
(Continued)

OTHER PUBLICATIONS

International Search Report, dated Jan. 12, 2009, issued in priority International Application No. PCT/GB2008/050630.
(Continued)

*Primary Examiner* — Young T. Tse
(74) *Attorney, Agent, or Firm* — Saul Ewing LLP

(57) ABSTRACT

A receiver front end receives a local frequency reference signal and a Frequency Shift Keying modulated signal comprising a synchronisation sequence, and downconverts the Frequency Shift Keying modulated signal to provide baseband in-phase and quadrature signals. A pulse generator receives the in-phase and quadrature signals, generates an in-phase pulse signal ILEAD comprising pulses aligned with edges of the baseband in-phase and quadrature signals when the baseband in-phase signal leads the baseband quadrature signal, and generates a quadrature pulse signal QLEAD comprising pulses aligned with edges of the baseband quadrature and in-phase signals when the baseband quadrature signal leads the baseband in-phase signal. A frequency corrector receives the in-phase and quadrature pulse signals during receipt of the synchronisation sequence, compares the pulse signals to a target, and generates a control signal for controlling the local signal generator in dependence upon the result of the comparison.

16 Claims, 3 Drawing Sheets

U.S. PATENT DOCUMENTS 6,553,083 B1   4/2003   Kawai
7,352,831 B2 *  4/2008   Quinlan et al. ............... 375/344

FOREIGN PATENT DOCUMENTS

GB    2 287 144 A    9/1995
JP    08-237313      9/1996

OTHER PUBLICATIONS

Search Report, dated Feb. 8, 2008, issued in UK priority Application No. GB0720410.0.
Shakeri et al., "A 1 volt CMOS 2/4-level FSK digital demodulator for pager applications," Circuits and Systems, 2000, 42nd Midwest Symposium on Aug. 8-11, 1999, vol. 1, pp. 219-222 (Aug. 8, 1999).

* cited by examiner

AUTOMATIC FREQUENCY CORRECTION

CROSS REFERENCE TO RELATED APPLICATIONS

This application claims the priority of PCT/GB2008/050630, filed on Jul. 28, 2008, which claims priority to Great Britain Application No. 0720410.0, filed Oct. 19, 2007, the entire contents of which are hereby incorporated in total by reference.

FIELD OF THE INVENTION

The present invention relates to automatic frequency correction and more particularly to an automatic frequency correction method and circuit for use in synchronising a clock of a receiver with that of a transmitter.

BACKGROUND TO THE INVENTION

Many transmission systems employ modulation of a carrier signal in order to convey data. For example, Frequency Modulation (FM) based systems modulate the frequency of a carrier signal in dependence upon an input voltage level. Frequency Shift Keying (FSK) is a particular implementation of the FM scheme, and involves shifting the frequency of the carrier between two discrete frequencies.

In order to recover data from an FM signal, a receiver must have access to the carrier frequency used by the transmitter. A demodulator typically mixes the received signal with the carrier frequency to recover the baseband signal. A demodulator scheme for FSK is described, for example, in Kaveh Shakeri, Hossein Hashemi, Ali Parsa, Ali Fotowat, Reza Rofougaran: "A 1 Volt CMOS 2/4-level FSK Digital Demodulator for Pager Applications".

Whilst it is possible to provide a clock at the receiver which operates at a frequency similar to the clock used by the transmitter, some automatic frequency correction (AFC) mechanism is required at the receiver in order to "lock" the receiver clock to the transmitter clock. AFC mechanisms usually consist of a clock and data recovery loop, forming a phase locked loop (PLL) that aligns rising edges of the clock to be in the middle of a data bit (of a demodulated data stream). The system has to be able to work in the presence of noise, which will introduce jitter to the edge positions of the data stream. In a typical receiver architecture, the AFC is a discrete block located after the demodulator as is illustrated in FIG. 1.

SUMMARY OF THE INVENTION

It is an object of the present invention to provide a mechanism for efficiently synchronising a local receiver side clock to that of a transmitter and which is robust in the presence of noise. This and other objects is achieved by generating I and Q pulse signals, pulses being triggered by rising and falling edges of baseband I and Q signals, when the I baseband signal leads the Q baseband signal and when the Q baseband signal leads the I baseband signal respectively, and using imbalances in the respective pulse signals to generate a local clock correction signal.

According to a first aspect of the present invention there is provided a Frequency Shift Keying receiver comprising:

a local signal generator for generating a local frequency reference signal and a bitclock signal;

a receiver front end arranged to receive said local frequency reference signal and a Frequency Shift Keying modulated signal comprising a synchronisation sequence, and to downconvert the Frequency Shift Keying modulated signal using the local frequency reference signal to provide baseband in-phase and quadrature signals;

a pulse generator coupled to said receiver front end to receive said in-phase and quadrature signals, and to generate an in-phase pulse signal comprising pulses aligned with edges of the baseband in-phase and quadrature signals when the baseband in-phase signal leads the baseband quadrature signal, and to generate a quadrature pulse signal comprising pulses aligned with edges of the baseband quadrature and in-phase signals when the baseband quadrature signal leads the baseband in-phase signal; and a frequency corrector coupled to said pulse generator to receive said in-phase and quadrature pulse signals during receipt of said synchronisation sequence, to compare the pulse signals to a target, and to generate a control signal for controlling the local signal generator in dependence upon the result of the comparison.

It will be appreciated that the term "Frequency Shift Keying" includes a number of FSK schemes including, but not limited to, binary FSK, minimum shift keying (MSK), and Gaussian FSK.

An embodiment of the present invention provides for a frequency corrector which counts consecutive pulses on each of the pulse signals and performs a correction using said control signal if the count on one of the pulse signals is less than a predefined number. A frequency corrector may alternatively, or in addition, count consecutive pulses on each of the pulse signals and perform a correction using said control signal if the count on one of the pulse signals exceeds a predefined number during any one bitclock period.

The receiver may comprise a demodulation decision unit coupled to the pulse generator to receive said in-phase and quadrature pulse signals, and to the local signal generator to receive said bitclock signal, and arranged for each bitclock period to generate a first output symbol if the pulses of the in-phase pulse signal are in the majority and to generate a second output symbol if the pulses of the quadrature pulse signal are in the majority. A retiming unit is coupled between said pulse generator and said demodulation decision unit, and coupled to the local signal generator to receive said bitclock signal, the retiming unit being arranged to delay the in-phase and quadrature pulse signals so as to lock them to the bitclock signal.

The retiming unit may comprise a plurality of cells each arranged to introduce a fixed delay to the pulse signals, each cell being selectively coupled to a corresponding output of the retiming unit. For each said cell, a comparator is provided for comparing the phase of the signal output by the cell against the bitclock signal. A control means is arranged to couple the output of that cell having a phase most closely aligned to the bitclock signal, to the corresponding output of the retiming unit. More particularly, the control means is arranged to count, for each cell, the number of complete pulse sequences falling within a given bitclock period on both the in-phase and quadrature pulse signals, and occurring over a predefined delay lock period, and to couple to the output of the retiming unit, the output of that cell for which the count is the highest.

Preferably, frame synchronisation circuitry is provided, coupled to said demodulation decision unit to receive and process a symbol stream output by the demodulation decision unit, and coupled to said receiver front end or to filtering and amplitude limiting circuitry to receive therefrom a received signal strength indicator indicative of whether or not a data burst has been received, the frame synchronisation circuitry being arranged to respond to an indication that a data burst has been received by turning on said frequency corrector. More preferably, the frame synchronisation circuitry is arranged to turn off said frequency corrector after it has received from said demodulation decision unit, a predefined number of symbols of said synchronisation sequence.

The frame synchronisation circuitry may be arranged to turn on said retiming unit substantially at the same time that said frequency detector is turned off, or at some time thereafter, and to at least partially turn off the retiming unit after the in-phase and quadrature pulse signals have been delay locked to said bitclock signal.

The frame synchronisation circuitry may be arranged to periodically turn on and then off the retiming unit after initial delay lock has been achieved, in order to correct for subsequent drift of the delay away from lock. In the same way, the frequency corrector may be turned on periodically. Preferably, the retiming unit and the frequency corrector are never on at the same time.

According to a second aspect of the present invention there is provided a method of demodulating a Frequency Shift Keying modulated signal comprising;

generating a local frequency reference signal and a bitclock signal;

receiving a Frequency Shift Keying modulated signal comprising a synchronisation sequence, and downconverting the Frequency Shift Keying modulated signal using said local frequency reference signal to provide baseband in-phase and quadrature signals;

generating an in-phase pulse signal comprising pulses aligned with edges of the baseband in-phase and quadrature signals when the baseband in-phase signal leads the baseband quadrature signal, and generating a quadrature pulse signal comprising pulses aligned with edges of the baseband quadrature and in-phase signals when the baseband quadrature signal leads the baseband in-phase signal; and during receipt of said synchronisation sequence, comparing said pulse signals to a target and generating a control signal for controlling the local signal generator in dependence upon the result of the comparison.

DETAILED DESCRIPTION OF CERTAIN EMBODIMENTS

Figure 1:
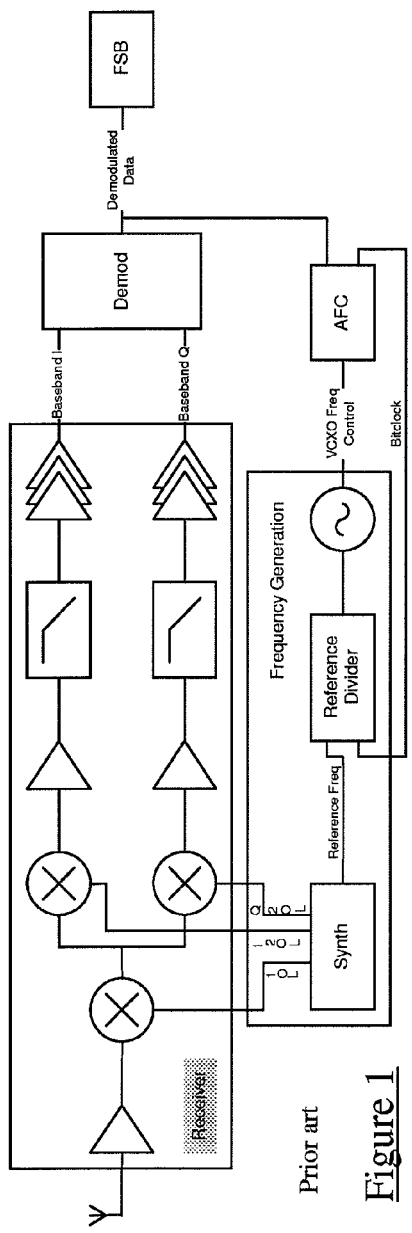
FIG. 1 illustrates schematically a known FSK demodulator.
Figure 2:
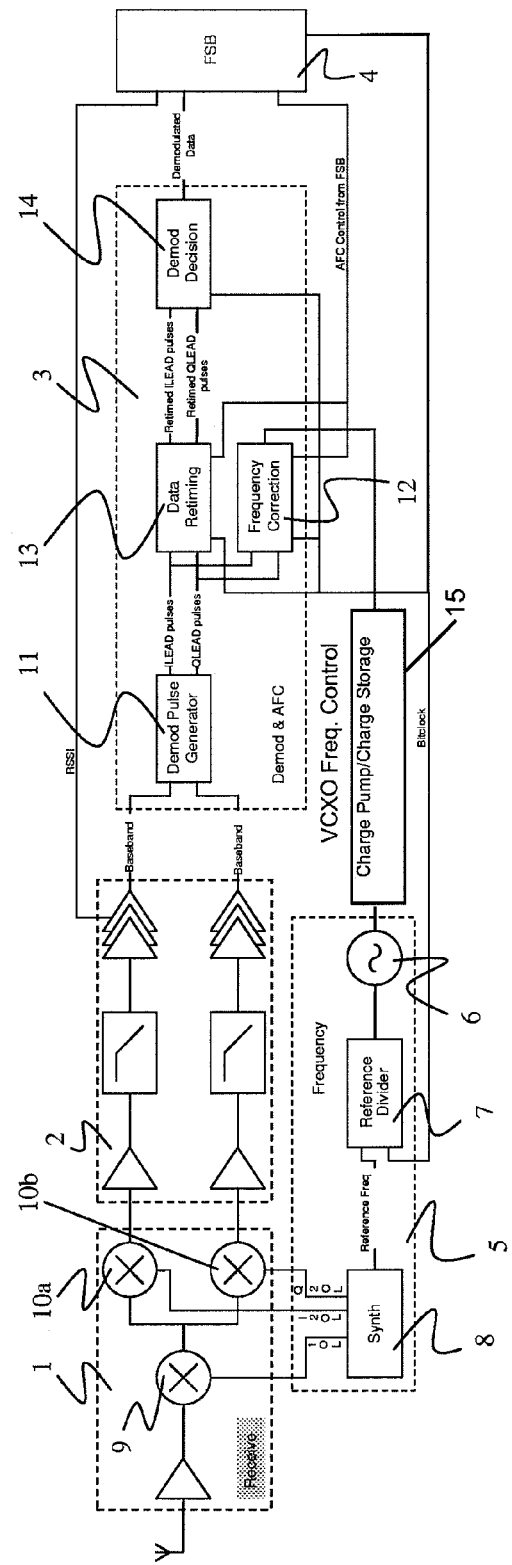
FIG. 2 illustrates a FSK demodulator with automatic frequency correction.

There is illustrated in FIG. 2 a receiver and demodulator architecture for handling FSK signals. Five main components can be identified within the architecture; a receiver block 1, a filter and limiter block 2, a demodulator and automatic frequency correction (AFC) block 3, a framing synchronisation block (FSB) 4, and a frequency generation block 5.

Frequency Generation Block

This block 5 comprises a voltage controlled crystal oscillator (VCXO) 6, using an off-chip crystal to generate a 16 MHz signal, and a reference divider 7 which receives the output of the VCXO. The reference divider performs appropriate frequency division of the signal and provides an input to an RF synthesizer 8. Assuming a carrier frequency of 870 MHz, the RF synthesiser aims to provide an intermediate downconversion signal LO1 at 870×(8/9) and a pair of baseband downconversion signals Lo2I, LO2Q at 870×(1/9). L01I and LO2Q are phase shifted with respect to one another by 90 degrees.

The reference divider also divides down the VCXO generated signal to provide a bitclock signal. The frequency of this signal approximates the rate at which data is modulated onto the received carrier signal, e.g. assuming a symbol modulation rate of 50 kbps, the bitclock has a frequency of 50 khz. That is to say that the period of the bitclock is equal in length to one symbol.

Receiver Front End Block

The receiver front end block 1 comprises a first intermediate mixer 9 which receives LO1 from the frequency generation block 5 and which downconverts the received signal to an intermediate frequency. The output of the first mixer is then fed in parallel to a pair of baseband mixers 10a, 10b which receive respectively L02I and LO2Q from the frequency generation block.

Filter and Limiter Block

This block 2 receives the mixed signals from the receiver front end block 1. The block 2 bandpass filters the signals across a frequency range including the data rate. Thus, for example, if the data rate is 50 kbps, the bandpass filter may pass signals between + and −100 KHz. The signal amplitudes are limited so that the outputs of the filter and limiter block approximates a square wave. The filter and limiter block thus provides at its outputs baseband in-phase (I) and quadrature (Q) signals.

The filter and limiter block 2 also comprises an amplitude detector (integrated into the I output amplifier stage) which generates at an output a received signal strength indicator (RSSI) signal.

Demodulator and AFC Block

This block 3 receives the baseband I and Q signals from the filter and limiter block 2. The role of the demodulator and AFC block is to recover the original data (symbol) stream from the I and Q signals. The block also corrects the frequency of the local voltage controlled crystal oscillator (VCXO) 6 to synchronise it to that in the transmitter, and delay locks the demodulated symbol stream to the local bitclock.

FSB Block

The FSB block 4 receives the demodulated and phase aligned data stream from the demodulator and AFC block. The FSB block also receives the bitclock from the VCXO. The FSB block is powered-up a short time after the receiver front end block 1, in order to give the receiver time to settle. Once powered-up, the FSB block receives the RSSI signal from the receiver front end block 1. In the event that the RSSI indicates that a signal of sufficient strength has been received, the FSB block 4 powers-up certain components of the demodulator and AFC block 3 as will be described below. The FSB block is arranged to detect the presence of a predefined preamble sequence in the data stream provided by the demodulator and AFC block 3. In the event that the preamble is detected, the FSB block detects and appropriately handles the subsequent data burst.

Considering in more detail the demodulator and AFC block 3 and the operation of the system, it is assumed by way of example that a transmitter transmits as a preamble to a data burst, a sequence of 48 1/0 symbol pairs, i.e. 101010 . . . etc. The demodulator and AFC block 3 uses a frequency locked loop (FLL) to achieve frequency correction of the VCXO 6 within 20 symbols of the start of the preamble, and then switches under the control of the FSB block 4 to a delay locked loop (DLL) to phase align the ILEAD and QLEAD pulse streams with the bitclock.

The demodulator and AFC block 3 comprises at its front end a demod pulse generator 11. This accepts the limited I and Q signals from the filter and limiter block 2. When the I signal is leading Q (a positive frequency shift corresponding to a 1 symbol) the demod pulse generator 11 generates a series of pulses (one for every edge in I and Q) on its ILEAD output. Similarly, when Q is leading I (a negative frequency shift corresponding to a 0 symbol) the circuit generates a series of pulses (one for every edge in I and Q) on its QLEAD output. Assuming that the data rate is 50 kbps, and assuming that the VCXO 6 is already locked to the transmitter carrier frequency, three pulses are generated on the appropriate output for each symbol received. That is to say that for a preamble sequence containing successive 1/0 symbol pairs, three pulses will appear alternately on the ILEAD and QLEAD output lines of the demod pulse generator.

Any mismatches between the local and transmitter crystal frequencies will result in the received signal being downconverted to a centre frequency slightly greater or slightly less than zero. In such a case the demod pulse generator 11 will no longer output three pulses for each 1 and 0 symbol of the data stream. In particular, if the baseband signal is centred above 0 Hz, the demod pulse generator outputs more pulses for a 1 and less for a 0 and vice-versa. This principle forms the basis of the frequency correction technique used here.

When the RSSI input to the FSB indicates that a signal is being received, the FSB powers-up a frequency correction unit 12. The FSB also powers-up a data retiming block 13. However, during an initial frequency locking period, the data retiming block does not act upon the ILEAD and QLEAD signals and merely passes these from the demod pulse generator 11 to a data demod decision block 14 (the demod pulse generator 11 and the data demod decision block 14 are powered-up together with the receiver block, although this need not be the case and the FSB block may be responsible for powering-up the entire demod and AFC block when the RSSI goes high).

The ILEAD and QLEAD outputs from the demod pulse generator 11 are fed to the frequency correction unit 12. This unit 12 monitors the ILEAD and QLEAD signals to detect any imbalance in the numbers of pulses appearing on the two signals. It continually counts the number of ILEAD pulses before a QLEAD pulse appears, and the number of QLEAD pulses before an ILEAD pulse appears. If the number of pulses is less than the target count (three in this case) then the frequency correction unit uses a charge pump and charge storage device 15 to move the local crystal frequency generated by the VCXO 6 in the correct direction. If the number of pulses of one type before swapping to the other type is greater than or equal to the target count, no action is taken. The charge pump and charge storage device 15 (along with the frequency correction unit 12) controls the local signal generator (VCXO6) by generating a control signal arranged to respond to charge pumped on to and charge pumped off of the charge storage device by the charge pump.

Figure 3:
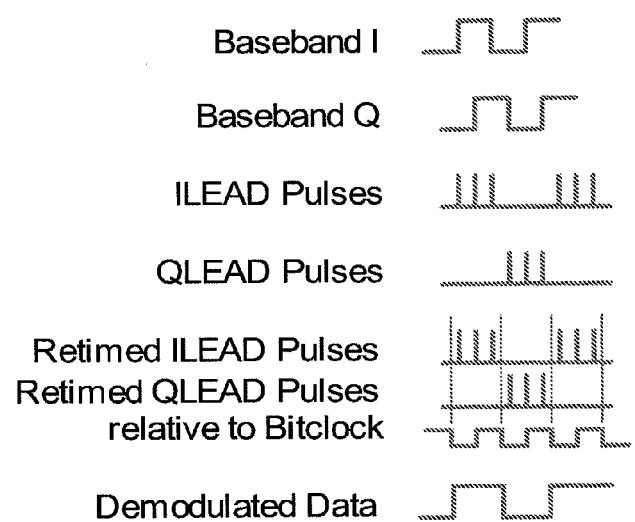
FIG. 3 illustrates signals present at various points in the demodulator of FIG. 2.
Figure 4:
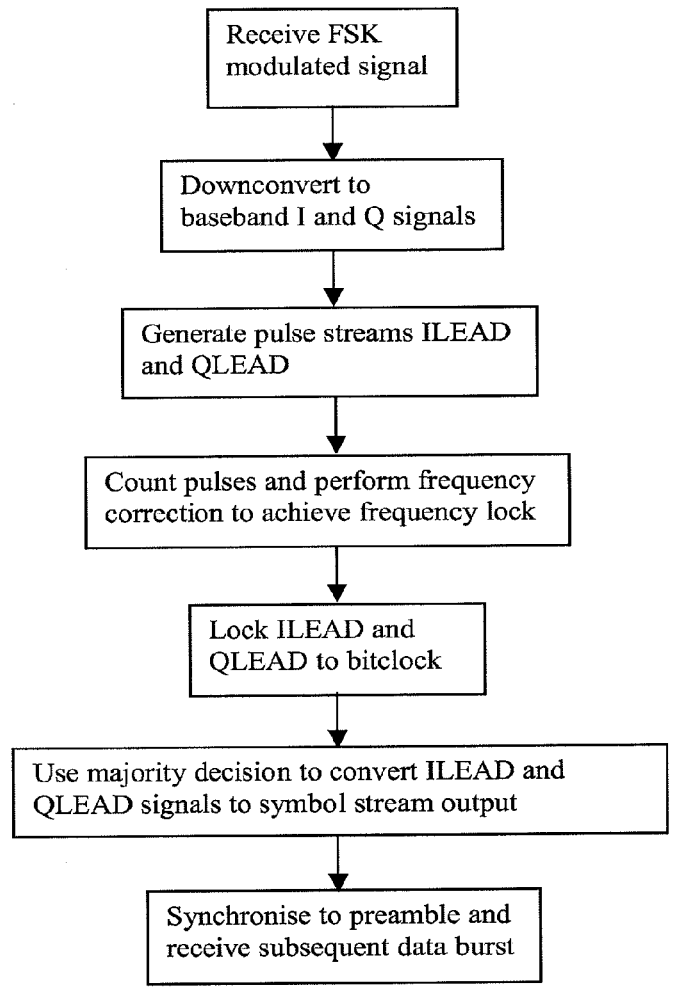
FIG. 4 is a flow diagram illustrating a method of demodulating an FSK modulated signal.

FIG. 3 shows exemplary signals present at various points in the system of FIG. 2.

Noise which can cause an occasional blip on the ILEAD or QLEAD signals can make the system move the VCXO frequency the wrong way momentarily. However, the mechanism described here is robust in the presence of noise as the demod decision block 14 uses majority detection (described further below) when comparing between the ILEAD and QLEAD pulses. This majority decision is tolerant of occasional blips and temporary changes in the number of ILEAD and QLEAD pulses.

This frequency correction technique works very well for small crystal errors. As long as there is at least some alternation between pulses on the ILEAD and the QLEAD signals, frequency lock should be achieved. However, when crystal errors are large, it is possible that only pulses of one kind are generated. To address this problem it is possible to configure the frequency correction unit 12 to look for an excessive number of pulses on either one of the signals within a bitclock period. If more than the target count (again three in this case) pulses of the same kind (ILEAD or QLEAD) are detected within a bitclock period, the frequency correction unit 12 will pump the charge pump in the appropriate direction. The number of pump steps ("pumps") applied to the charge pump is determined by the number of pulses over the target count. For example if five successive pulses are detected on one signal and the target count is three, then two pumps are applied to the charge pump. Thus, the output of the frequency correction unit 12 is proportional to the error.

Typically, both frequency correction techniques, fine and course, can be switched on simultaneously. In addition, the gain of the frequency correction loop (in terms of the adjustments made to the VCXO per unit error) may be programmable and can be changed during operation. Thus the loop can work with a high gain initially to achieve quick lock, and a low gain later to reduce the error in the lock point.

As already described, the demod decision unit 14 receives the ILEAD and QLEAD signals during the frequency locking period. The demod decision unit examines the ILEAD and QLEAD pulses and compares the number of pulses in the ILEAD line to that in the QLEAD line during each bitclock period and decides if the data symbol transmitted was a 1 or a 0 (based on simple majority). The output of the demod decision unit 14 is therefore a representation of the data signal. The FSB block 4 monitors the output of the demod decision unit 14 following power-up of the frequency correction and data retiming units. The FSB block 4 is nominally set to use the first ten symbols of a 1010 preamble to achieve frequency lock. Of course, the actual number of symbols used in frequency correction is programmable. Whatever value is programmed, after this number of symbols has been detected, the FSB block uses the FC Enable and DR Enable lines to disable the frequency correction unit 12 and enable the data retiming unit 13. The ILEAD and QLEAD signals are then delay locked to the bitclock output by the VCXO 6 using the remaining bits of the received preamble. More specifically, each three pulse sequence is on average aligned around a rising edge of the bitclock, i.e. around the centre of each bitclock period. It will be appreciated that the data retiming block 13 is not a traditional closed loop delay locked loop (DLL). Rather, it is an open loop DLL which gives the system faster lock times.

For each of the ILEAD and QLEAD signals, the data retiming unit 13 uses a delay line that is 2 symbols long (40 μs) with a programmable resolution. The delay line consists of cells that serially feed the ILEAD/QLEAD pulses from one cell to another. Delay locking is conducted over a programmable period, e.g. 10 bitclock periods. For each cell, the number of bitclock periods for which the ILEAD and QLEAD streams are correctly aligned is counted over the locking period. Correct alignment is considered to occur when pulses appear in only one of the streams during a given bitclock period. At the end of the delay locking period, the cell with the most correctly aligned symbols is chosen as the required lock point and the output of that cell is used to provide the retimed ILEAD and QLEAD pulse streams to the demod decision block 14.

Delay locking should be completed quickly, e.g. within 10 data bitclock periods. Therefore, a short time after the FSB has enabled the data retiming unit 13 to perform delay locking, it can power-down the relevant components of the data retiming unit, i.e. those involved in the bitclock comparison. The FSB block can then look for the end of the preamble in the data stream coming from the demod decision unit 14, and begin receiving and processing the data.

The FSB block may leave the data retiming block powered-up in its entirety and periodically update the delay locking. This might be done for example every ten bitclock periods. However the lock point is only allowed to move at most half a bitclock period in either direction so that the block never gains or slips a symbol. In the same way, the frequency correction unit may be periodically turned on to compensate for frequency drift. Periodic delay and frequency correction enable longer data bursts to be received reliably.

It will be appreciated by the person of skill in the art that various modifications may be made to the above described embodiment without departing from the scope of the present invention. For example, whilst the above discussion has been concerned with conventional FSK modulation schemes where the frequency of a carrier signal is shifted by discrete positive and negative amounts, the invention is also applicable to other FSK schemes including Gaussian FSK schemes.

The invention claimed is:

1. A Frequency Shift Keying receiver comprising:
   a local signal generator for generating a local frequency reference signal and a bitclock signal;
   a receiver front end arranged to receive said local frequency reference signal and a Frequency Shift Keying modulated signal comprising a synchronisation sequence, and to downconvert the Frequency Shift Keying modulated signal using the local frequency reference signal to provide baseband in-phase and quadrature signals;
   a pulse generator coupled to said receiver front end to receive said baseband in-phase and quadrature signals, to generate an in-phase pulse signal comprising pulses aligned with edges of the baseband in-phase and quadrature signals when the baseband in-phase signal leads the baseband quadrature signal, and to generate a quadrature pulse signal comprising pulses aligned with edges of the baseband in-phase and quadrature signals when the baseband quadrature signal leads the baseband in-phase signal; and
   a frequency corrector coupled to said pulse generator to receive said in-phase and quadrature pulse signals during receipt of said synchronisation sequence, to compare the in-phase and quadrature pulse signals to a target, and to generate a control signal for controlling the local signal generator in dependence upon the result of the comparison.

2. The receiver according to claim 1, wherein said frequency corrector counts consecutive pulses on each of the in-phase and quadrature pulse signals and performs a correction using said control signal if the count on one of the in-phase and quadrature pulse signals is less than a predefined number.

3. The receiver according to claim 1, wherein said frequency corrector counts consecutive pulses on each of the in-phase and quadrature pulse signals and performs a correction using said control signal if the count on one of the in-phase and quadrature pulse signals exceeds a predefined number during any one bitclock period.

4. The receiver according to claim 1 further comprising filtering and amplitude limiting circuitry coupled between said receiver front end and said pulse generator.

5. The receiver according to claim 4, further comprising a demodulation decision unit coupled to the pulse generator to receive said in-phase and quadrature pulse signals, and to the local signal generator to receive said bitclock signal, and arranged for each bitclock period to generate a first output symbol if the pulses of the in-phase pulse signal are in the majority and to generate a second output symbol if the pulses of the quadrature pulse signal are in the majority.

6. The receiver according to claim 5 further comprising a retiming unit coupled between said pulse generator and said demodulation decision unit, and coupled to the local signal generator to receive said bitclock signal, the retiming unit being arranged to delay the in-phase and quadrature pulse signals so as to lock them to the bitclock signal.

7. The receiver according to claim 5 further comprising frame synchronisation circuitry coupled to said demodulation decision unit to receive and process a symbol stream output by the demodulation decision unit, and coupled to said receiver front end or to the filtering and amplitude limiting circuitry to receive therefrom a received signal strength indicator indicative of whether or not a data burst has been received, the frame synchronisation circuitry being arranged to respond to an indication that a data burst has been received by turning on said frequency corrector.

8. The receiver according to claim 7, the frame synchronisation circuitry being arranged to turn off said frequency corrector after it has received from said demodulation decision unit, a predefined number of symbols of said synchronisation sequence.

9. The receiver according to claim 7, the frame synchronisation circuitry being arranged to periodically turn on and then off the frequency corrector after initial frequency synchronisation has been achieved, in order to correct for subsequent drift.

10. The receiver according to claim 5 further comprising a retiming unit coupled between said pulse generator and said demodulation decision unit, and coupled to the local signal generator to receive said bitclock signal, the retiming unit being arranged to delay the in-phase and quadrature pulse signals so as to lock them to the bitclock signal; and
    frame synchronisation circuitry coupled to said demodulation decision unit to receive and process a symbol stream output by the demodulation decision unit, and coupled to said receiver front end or to the filtering and amplitude limiting circuitry to receive therefrom a received signal strength indicator indicative of whether or not a data burst has been received, the frame synchronisation circuitry being arranged to respond to an indication that a data burst has been received by turning on said frequency corrector, the frame synchronisation circuitry being arranged to turn off said frequency corrector after it has received from said demodulation decision unit, a predefined number of symbols of said synchronisation sequence, and the frame synchronisation circuitry being arranged to turn on said retiming unit substantially at the same time that said frequency detector is turned off, or at some time thereafter, and to at least partially turn off the retiming unit after the in-phase and quadrature pulse signals have been delay locked to said bitclock signal.

11. The receiver according to claim 10, the frame synchronisation circuitry being arranged to periodically turn on and then off the retiming unit after initial delay lock has been achieved, in order to correct for subsequent drift of the delay away from lock.

12. A method of demodulating a Frequency Shift Keying modulated signal comprising;
   generating a local frequency reference signal and a bit-clock signal;
   receiving the Frequency Shift Keying modulated signal comprising a synchronisation sequence, and downconverting the Frequency Shift Keying modulated signal using said local frequency reference signal to provide baseband in-phase and quadrature signals;
   generating an in-phase pulse signal comprising pulses aligned with edges of the baseband in-phase and quadrature signals when the baseband in-phase signal leads the baseband quadrature signal, and generating a quadrature pulse signal comprising pulses aligned with edges of the baseband in-phase and quadrature signals when the baseband quadrature signal leads the baseband in-phase signal; and
   during receipt of said synchronisation sequence, comparing said in-phase and quadrature pulse signals to a target and generating a control signal for controlling the local frequency reference signal in dependence upon the result of the comparison.

13. The method according to claim 12 further comprising counting consecutive pulses on each of the in-phase and quadrature pulse signals and performing a frequency correction using said control signal if the count on one of the in-phase and quadrature pulse signals is less than a predefined number.

14. The method according to claim 13 further comprising performing said frequency correction upon detection of a signal exceeding a predefined amplitude, and discontinuing said frequency correction after a predefined number of symbols has been detected.

15. The method according to claim 14 further comprising locking the delay of the baseband in-phase and quadrature signals to said bitclock signal during or following frequency locking.

16. The method according to claim 12 further comprising counting consecutive pulses on each of the in-phase and quadrature pulse signals and performing a correction using said control signal if the count on one of the in-phase and quadrature pulse signals exceeds a predefined number during any one bitclock period.

* * * * *